(12) United States Patent
Spanggaard et al.

(10) Patent No.: US 12,152,671 B2
(45) Date of Patent: Nov. 26, 2024

(54) SEAL ASSEMBLY AND METHOD OF TESTING

(71) Applicant: Siemens Energy Global GmbH & Co. KG, Bayern (DE)

(72) Inventors: Jens Holt Spanggaard, Skollenborg (NO); Kelly Turner, Dalton-In-Furness (GB)

(73) Assignee: Siemens Energy Global GmbH & Co. KG, Bayern (DE)

( * ) Notice: Subject to any disclaimer, the term of this patent is extended or adjusted under 35 U.S.C. 154(b) by 752 days.

(21) Appl. No.: 17/294,391

(22) PCT Filed: Nov. 6, 2019

(86) PCT No.: PCT/EP2019/080349
§ 371 (c)(1),
(2) Date: May 15, 2021

(87) PCT Pub. No.: WO2020/108934
PCT Pub. Date: Jun. 4, 2020

(65) Prior Publication Data
US 2022/0026303 A1    Jan. 27, 2022

(30) Foreign Application Priority Data

Nov. 27, 2018  (GB) .................................... 1819314

(51) Int. Cl.
*F16J 15/00*    (2006.01)
*G01M 3/22*    (2006.01)
(Continued)

(52) U.S. Cl.
CPC ........... *F16J 15/002* (2013.01); *G01M 3/221* (2013.01); *G01M 3/2838* (2013.01);
(Continued)

(58) Field of Classification Search
CPC ........ F16J 15/002; F16J 15/004; H02G 15/02; H02G 15/04; H02G 15/043; H02G 15/046;
(Continued)

(56) References Cited

U.S. PATENT DOCUMENTS 4,579,372 A    4/1986  Morrill
8,739,607 B2 *  6/2014  Slack .................. G01M 3/2869
                                                73/49.1
(Continued)

FOREIGN PATENT DOCUMENTS

DE    2550742 A1    5/1977
GB    1380577 A    1/1975
(Continued)

OTHER PUBLICATIONS

DE2550742A1 Machine Translation—Retrieves espace.net Apr. 29, 2024.*
(Continued)

*Primary Examiner* — Nicholas L Foster
(74) *Attorney, Agent, or Firm* — Wolter Van Dyke Davis, PLLC (57) ABSTRACT

A dual seal termination assembly having a first termination body; and a sleeve at least partially surrounding the first termination body; primary and secondary seals adapted to be fitted between the first termination body and the sleeve; a test port in the first termination body to supply test fluid to a point between the primary and secondary seals of the first termination body; the test port being adapted to receive test fluid at a predetermined pressure, such that a pressure difference is created between the point between the primary and secondary seals and a point on the other side of the primary seal and a point on the other side of the secondary seal.

11 Claims, 5 Drawing Sheets

(51) Int. Cl.
*G01M 3/28* (2006.01)
*G02B 6/44* (2006.01)

(52) U.S. Cl.
CPC ........ *G01M 3/2869* (2013.01); *G01M 3/2853* (2013.01); *G02B 6/44775* (2023.05)

(58) Field of Classification Search
CPC .... G02B 6/44775; G01M 3/04; G01M 3/221; G01M 3/2838; G01M 3/2869
See application file for complete search history.

(56) References Cited

U.S. PATENT DOCUMENTS

| | | | |
|---|---|---|---|
| 10,297,990 B2 * | 5/2019 | Villmark | .................. H02G 9/02 |
| 2005/0139360 A1 | 6/2005 | Van Bilderbeek | |
| 2010/0289225 A1 | 11/2010 | Lafleur et al. | |
| 2012/0000273 A1 * | 1/2012 | Slack | .................. G01M 3/2869 |
| | | | 73/49.8 |
| 2015/0345243 A1 * | 12/2015 | Christie | .................. E21B 23/14 |
| | | | 166/75.13 |
| 2018/0375305 A1 * | 12/2018 | Villmark | ............ G02B 6/44775 |

FOREIGN PATENT DOCUMENTS

| | | |
|---|---|---|
| GB | 2129948 A | 5/1984 |
| GB | 2337602 A | 11/1999 |
| JP | S56100335 A | 8/1981 |
| WO | 2010105344 A1 | 9/2010 |
| WO | 2015183562 A1 | 12/2015 |

OTHER PUBLICATIONS

International search report and written opinion dated Feb. 12, 2020 for corresponding PCT/EP2019/080349.

* cited by examiner

SEAL ASSEMBLY AND METHOD OF TESTING

CROSS REFERENCE TO RELATED APPLICATIONS

This application is the US National Stage of International Application No. PCT/EP2019/080349 filed 6 Nov. 2019, and claims the benefit thereof. The International Application claims the benefit of United Kingdom Application No. GB 1819314.4 filed 27 Nov. 2018. All of the applications are incorporated by reference herein in their entirety.

FIELD OF INVENTION

This invention relates to a dual seal termination, in particular for an underwater, or subsea, connector to cable termination and a method of testing the seals during manufacturing of the termination.

BACKGROUND OF INVENTION

In oil and gas production, subsea terminations of umbilicals, such as umbilical terminations, or penetrators, are used when connecting umbilicals to subsea equipment. Such subsea terminations need to be extremely reliable because of the cost and difficulties in accessing and repairing failed equipment subsea, so most users require that there are both primary and secondary seals on the terminations to seal the various cables, such as, electrical, fibre, hydraulic, or other, cables, within the umbilical from the water, as well as protecting them from other liquids, such as oils, used in the equipment. This provides a back-up in case one of the seals fails. However, independent testing of both seals is complicated and expensive, so it is normal practice that a single test of both seals together is carried out and a positive result of that test assumes that both seals are effective.

SUMMARY OF INVENTION

In accordance with a first aspect of the present invention, a dual seal termination assembly comprises a first termination body; and a sleeve at least partially surrounding the first termination body; primary and secondary seals adapted to be fitted between the first termination body and the sleeve; a test port in the first termination body to supply test fluid to a point between the primary and secondary seals of the first termination body; the test port being adapted to receive test fluid at a predetermined pressure, such that a pressure difference is created between the point between the primary and secondary seals and a point on the other side of the primary seal and a point on the other side of the secondary seal.

Test fluid may be supplied to the test port to the point between the seals by a suitable device operating either at an elevated pressure with respect to the surroundings, or at a reduced pressure, e.g. by applying a vacuum, or pressure above atmospheric pressure at the point between the seals, for an assembly assembled at atmospheric pressure.

The assembly may further comprise a second termination body; wherein the sleeve is connected between the first termination body and the second termination body to form a chamber; and, wherein the assembly further comprises primary and secondary seals adapted to be fitted between the second termination body and the sleeve.

The second termination body may comprise a first part and a second part; wherein the primary and secondary seals adapted to be fitted between the second termination body and the sleeve are located in the first part; wherein a test port is provided in the first part of the second termination body to supply test fluid to a point between the primary and secondary seals of the first part of the second termination body.

The test port may be adapted to receive test fluid at a predetermined pressure, such that a pressure difference is created between the point between the primary and secondary seals of the first part of the second termination body and a point on the other side of the primary seal and a point on the other side of the secondary seals of the first part of the second termination body.

The assembly may further comprise a sleeve fitted to the second part of the second termination body; and primary and secondary seals between an outer surface of the second termination body and an inner surface of the sleeve.

The second part of the second termination body may comprise an opening adapted to receive a closure member; and a test port at a point between the primary and secondary seals of the second part of the second termination body.

The test port may be adapted to receive test fluid at a predetermined pressure, such that a pressure difference is created between the point between the primary and secondary seals of the second part of the second termination body and a point on the other side of the primary seal and a point on the other side of the secondary seal of the second part of the second termination body.

The assembly may further comprise a third termination body and the sleeve is fitted between the second part of the second termination body and the third termination body.

In accordance with a second aspect of the present invention, a dual seal termination assembly test system may comprise a dual seal assembly according to the first aspect and a detector for detecting whether a test fluid has passed through any of the primary and secondary seals.

The assembly may further comprise a detector test port to provide fluid that has passed through one of the primary or secondary seals to the detector.

The test fluid may comprise helium or nitrogen.

The primary and secondary seals may comprise an elastomer.

The termination assembly may comprise a termination for an optical fibre cable or an electrical cable.

The predetermined pressure may be one of a vacuum, or a pressure greater than 1.1 times atmospheric pressure at the test location.

In accordance with a third aspect of the present invention, a method of testing dual seals of a subsea termination comprises assembling a sleeve to a first termination body and to a first part of a second termination body; providing primary and secondary seals between the first body and the sleeve and between the second body and the sleeve to form a chamber between the two bodies; generating a pressure difference between a point located between the primary and secondary seals of the first termination body and a point located the other side of either of the primary and secondary seals; and detecting whether or not test fluid has passed through either of the primary and secondary seals.

In accordance with a fourth aspect of the present invention, a method of testing dual seals of a subsea termination comprises providing primary and secondary seals on a first termination body; assembling a sleeve to the first termination body such that the seals are between the sleeve and the first termination body; supplying test fluid through a test port to a point between the primary and secondary seals of the first termination body, such that a pressure difference is created between the point and the other side of the primary seal and the other side of the secondary seal; and detecting whether or not test fluid has passed through either of the primary and secondary seals.

The method may further comprise assembling the sleeve to a second termination body to form a chamber between the first termination body and the second termination body.

The method may further comprise fitting a closure to an opening in a first part of the second termination body; providing primary and secondary seals between an outer surface of the closure and an inner surface of the opening; supplying test fluid through a test port to a point between the primary and secondary seals of the first part of the second termination body, such that a pressure difference is created between the point and the other side of the primary seal and the other side of the secondary seal of the first part of the second termination body; and detecting whether or not test fluid has passed through either of the primary and secondary seals.

The method may further comprise burying the test port in the second part of the second termination body by fitting a sleeve and primary and secondary seals between the sleeve and the second termination body.

The step of fitting the sleeve may further comprise fitting the sleeve between the second part of the second termination body and a third termination body; providing primary and secondary seals between an outer surface of the closure and an inner surface of the opening; supplying test fluid through a test port to a point between the primary and secondary seals of the first termination body; and detecting whether or not test fluid has passed through either of the primary and secondary seals.

The method may further comprise replacing a seal if test fluid that has passed through that seal has been detected; and repeating the testing step until a seal is proven.

The predetermined pressure may be one of a vacuum, or a pressure greater than 1.1 times atmospheric pressure.

BRIEF DESCRIPTION OF THE DRAWINGS

An example of a seal termination assembly and associated method of testing the seal assembly during manufacture in accordance with the present invention will now be described with reference to the accompanying drawings in which.

DETAILED DESCRIPTION OF INVENTION

Many subsea products require a back-up seal in additional to a primary seal to keep water out of the product when deployed. An example of this is a penetrator used to terminate an umbilical and connect it to equipment subsea. Dual-sealing solutions are employed to mitigate the risk of a failure post-deployment, which can be extremely costly, both in accessing and replacing the part and in loss of production capability in the meantime.

U.S. Pat. No. 5,468,023 describes an example of a flowline connector, provided with a test port, by which the integrity of the flowline connector seal may be tested. A test fluid is applied between the flowline connector seal and a pair of test seals. The test pressure acts between the test seals and the metal seal conical surfaces. Thus, the test seals and metal seal are tested together.

For umbilical terminations, it has been normal practice to perform a single test of both seals together, as the seals are not easily testable individually. To address the problem of both seals becoming damaged, the seals may be stepped in diameter. This decreases the probability of both sealing surfaces including the same defect, though it does not prove both seals. The verification of both seals is subsequently assumed and not proven.

Figure 1:
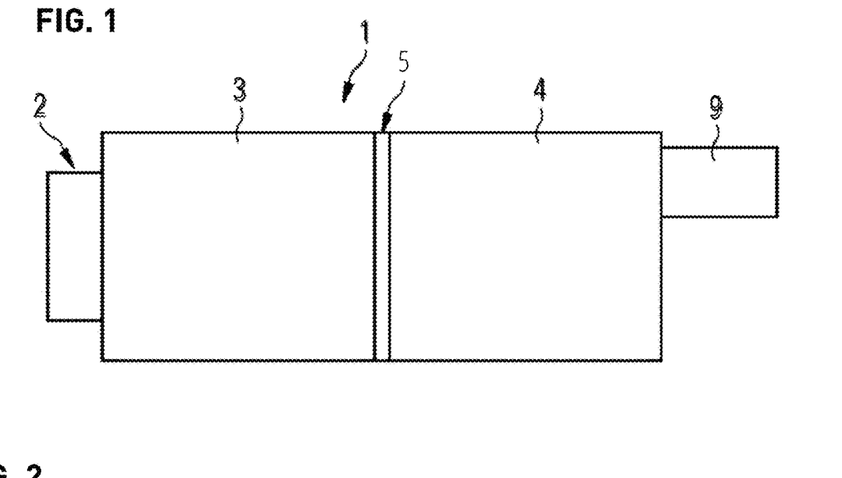
FIG. 1 illustrates an example of a subsea umbilical termination in which a testable dual seal assembly according to the invention may be incorporated.
Figure 2:
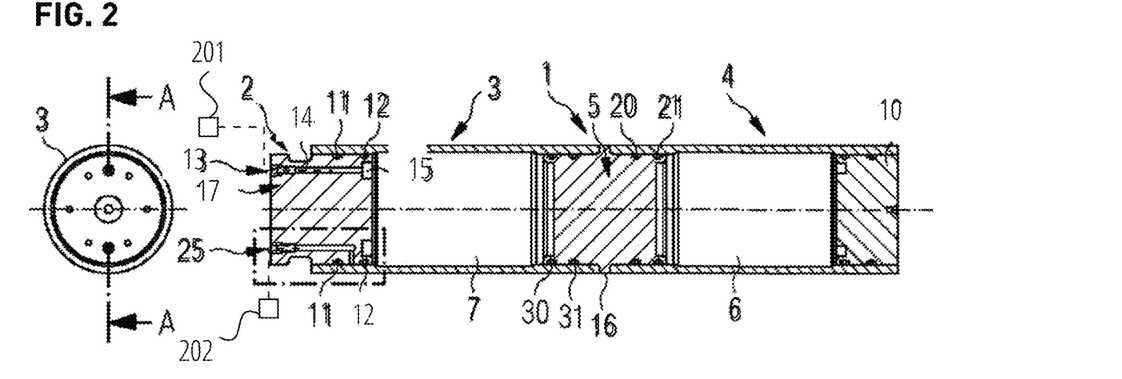
FIG. 2 illustrates the example of FIG. 1 incorporating a first embodiment of a seal assembly and test arrangement according to the present invention.

FIG. 1 illustrates an example of a penetrator termination 1 of an umbilical 2 in which a seal assembly and testing method of the present invention may be applied. In this example, the termination 1 comprises a first body 5 which may comprise a high pressure penetrator within it (not shown) by which the umbilical termination 2 is joined to a connector 9 via protective sleeve 3 fitted over part of the body 5 at the umbilical end and another sleeve 4 fitted over the other part of the body 5 and a further body (not shown) of the connector assembly 9. At the end of the sleeve 4, the connector 9 may be a hose and fibre connection attached to an end cap of a chamber formed by sleeve 4. Connections may be made to subsea equipment, such as distribution units, switchgear or drives via the umbilical. The protective sleeves, or sheathes 3, 4 may be applied as part of the assembly process and the seals tested thereafter via external test ports, the test ports being sealed separately once testing has been completed. Alternatively, the sleeves 3, 4 may be applied after the connection has been made and tested, burying the test port. In both cases, the connection between the penetrator and the umbilical 2 is made and sealed topside and has both primary and secondary seals. The test method may be carried out by applying an elevated pressure to push a test fluid through the seals, or by applying a vacuum to draw a test fluid through the seals. Whichever method is chosen, a pressure difference is required from a point between the two seals being tested to a point on the other side of each of those seals. For example, if there is a chamber on the other side of one seal, then the pressure in that chamber is different from the pressure at the point between the two seals where the test fluid is applied. If the other side of one or both seals is outside the seal, but not in a chamber, then typically the pressure there is atmospheric pressure, so the test fluid must be applied at a pressure above or below atmospheric pressure. Whatever the applied pressure, such as a vacuum or a pressure above atmospheric pressure, a pressure difference is required, i.e., there must be an over pressure or under pressure with respect to the applied pressure, either at the point between the two seals or at the other side of each seal, according to where the vacuum or pressure is applied, so that helium leaks through if the seal is faulty. FIG. 2 is a section A-A through the termination 1 of FIG. 1. The termination comprises a central body, the first body 5, which, when fully assembled joins a second body 10 to a third body 17 of the umbilical termination 2. At the penetrator end of the termination 1, where one or more cables 9 (not shown in FIG. 2) may be connected through the second body 10, an oil filled chamber 6 is defined between the second body 10, the sheath 4 and the first body 5. The protective sheath 4 is mounted between the first body 5 and the second body 10. At the umbilical end of the termination 1, where an umbilical may be connected, the sleeve 3 defines a test chamber 7 between the first body 5 and a third body 17. The protective sheath 3 is mounted between the first and third bodies. In the test chamber 7, a specific pressure, in this example, 1 atmosphere, may be maintained in operation. In the example shown, the first body 5 further comprises a lip 16 between the two sheathes 3, 4.

The body 17 of the umbilical 2 is provided with primary and secondary seals 11, 12 between the circumference of the body 17 and the inner surface of the protective sleeve 3. Sealable test ports 13 and 25 are provided. One of the test ports may be used to supply helium (supply/detector 201) and the other to detect it (using supply/detector 202), and vice versa. For example, if sealable test port 25 is used to supply test fluid to a point between the two sets of seals 11, 12 of the umbilical such that supply/detector 202 is a supply, then sealable test port 13 is used to test whether the supplied test fluid has passed through seal 12 with supply/detector 201 acting as a detector or sniffer. During testing, the pressure at the point between the seals is different from the pressure on the other side of each seal. For example, if a test fluid, such as helium, is supplied between the two seals 11, 12 from test port 25 and a helium sniffer is used at test port 13, the pressure difference may be provided by, for example, applying a vacuum at port 13. Any helium detected at test port 13 indicates that the seal 12 has failed. Similarly, if a helium sniffer is used at the edge of sleeve 3, on body 17, with a suitable pressure difference between the point between the seals and the outside edge of the sleeve, then any helium detected indicates that seal 11 has failed.

Figure 3:
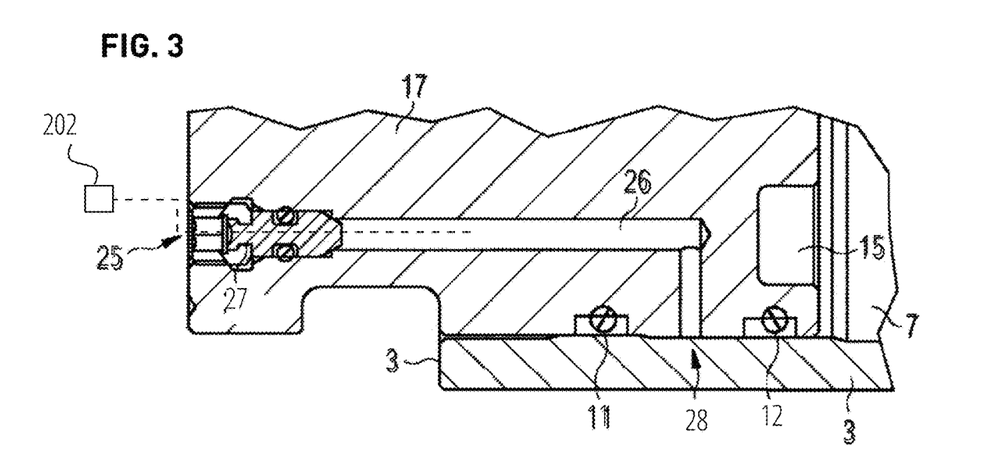
FIG. 3 illustrates the first embodiment of FIG. 2, in more detail.

Alternatively, the functions of the two test ports may be swapped, so a vacuum may be applied at test port 25 which is connected to the point between the two seals to generate a pressure difference to suck the helium through if either of seals 11 or 12 have failed. When helium is sprayed into test port 13 and passes through chamber 7, then if it is detected at test port 25, that indicates that seal 12 has failed. In the example shown, the chamber 7 includes an additional section 15, but this does not affect the testing. When helium is sprayed at the edge of sleeve 3, on body 17 and any helium detected at port 25 indicates that the seal 11 has failed. FIG. 3 illustrates the test port at the umbilical end in more detail. In the example of FIG. 3, as described above with respect to FIG. 2, the test may be carried out by supplying a suitable fluid, typically a gas, such as helium, or nitrogen, gas into the test port 25 and detecting whether any gas enters the chamber 7, as described above, or exits from the termination, for example, by using a helium sniffer on the outside of the termination, or at port 13. Alternatively, Helium may be sprayed from the outside between body 17 and sleeve 3, so that if seal 11 fails, helium is detected at port 25 while a vacuum is pulled at tube 26 via an adaptor in place at port 25. Thereafter, Helium may be supplied to the chamber 7, 15 by way of tube 14 from port 13, again whilst a vacuum is pulled at tube 26 via an adaptor at port 25. Helium molecules are very small, so can pass through even very small gaps where the seal is not complete. For the pressurised example, the porting 26 in the body 17 directs test fluid to a point 28 between the primary seal 11 and the secondary seal 12 and if the helium then exits from the body, it can be detected by removable test equipment, such as the helium sniffer (not shown). At the exit end of the test port 25, a conventional dual seal plug 27 is provided to seal the port once the tests have been completed. The primary and secondary seals 11, 12 are formed between the body 17 and the external sleeve 3. The test port between the primary seal and the secondary seal between the body and the sleeve makes it possible to test each of the primary and secondary seals individually. Assuming that no helium is detected on completion of the gas leak test, either outside the body and sleeve in line with the primary seal 11, or at the exit of the test port 13, whether using a vacuum or pressurised method, then this proves that there is a true dual-barrier between the external environment and the internal chamber 7, rather than just one of the seals being effective and the other one being assumed to work.

Figure 4A:
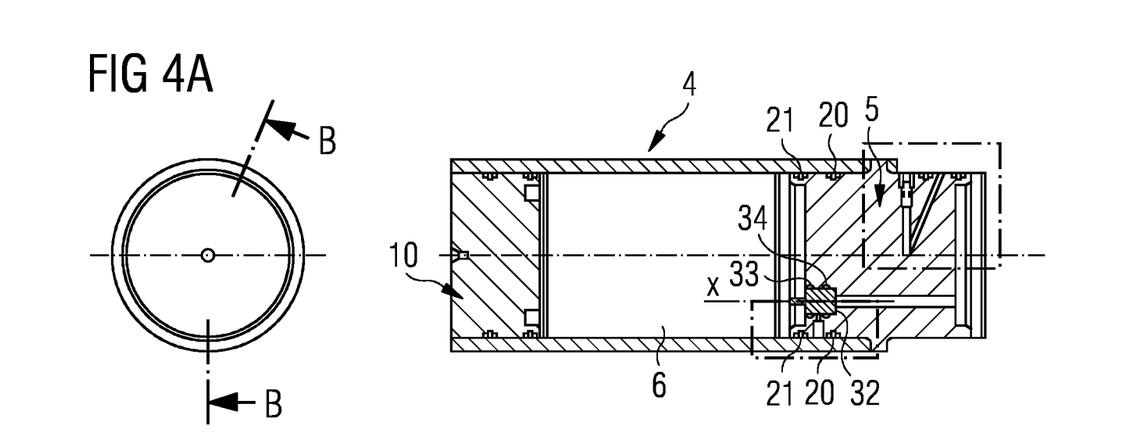
FIGS. 4a and 4b illustrate the example of FIG. 1 incorporating second and third embodiments of a seal assembly and test arrangement according to the present invention.
Figure 4B:
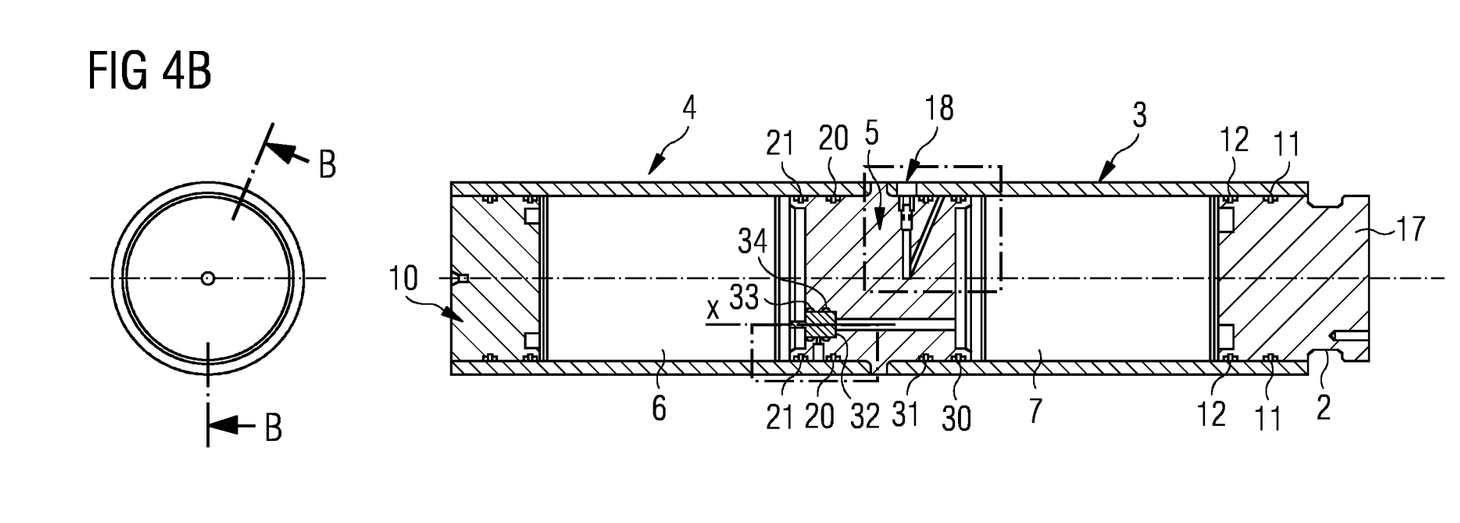
Figure 5A:
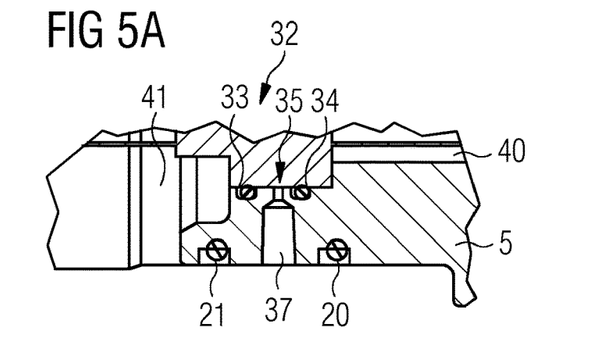
FIGS. 5a and 5b illustrate the third embodiment of FIG. 2, in more detail.
Figure 5B:
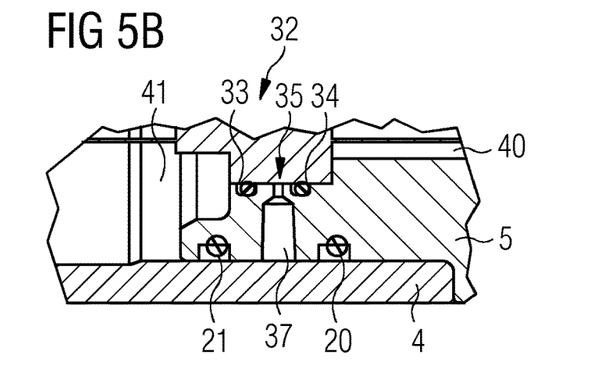
Figure 6:
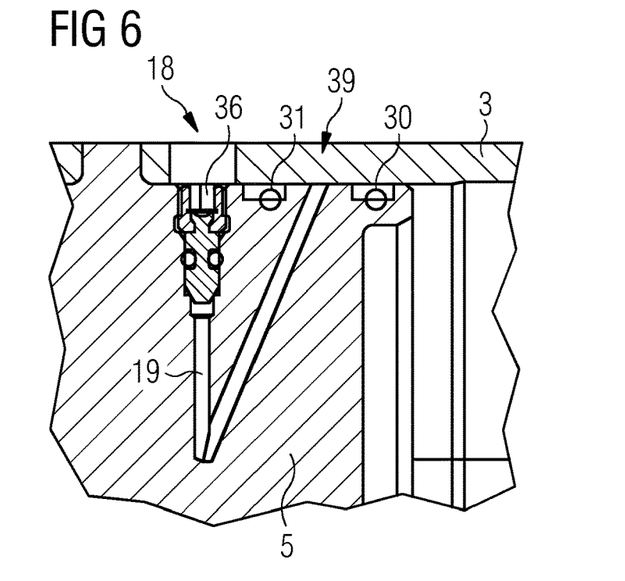
FIG. 6 illustrates the second embodiment of FIG. 2, in more detail.

Typically, the testing method is carried out in stages, as illustrated in FIGS. 4a and 4b. The seals of the high pressure penetrator 32 in first body 5 may be tested first, as shown in more detail in FIGS. 5a and 5b, so that the sleeves 3, 4 can be assembled over the body. Then the remaining tests carried out with the sleeves in position. As can be seen in FIG. 4a, which is a section B-B through the termination 1 of FIG. 1, the first body is provided with a set of seals 20, 21 which seal the sleeve 4 around the test chamber to the first body 5. Testing of a first set of seals 33, 34 is illustrated for a buried test port 37, shown in more detail in FIGS. 5a and 5b. A second set of seals 30, 31 shown in FIG. 4b, seal the sleeve 3 of the chamber 7 to the first body 5. If testing of seals 30, 31 is required, then a test port of the type shown in FIG. 6 is used.

Figure 7:
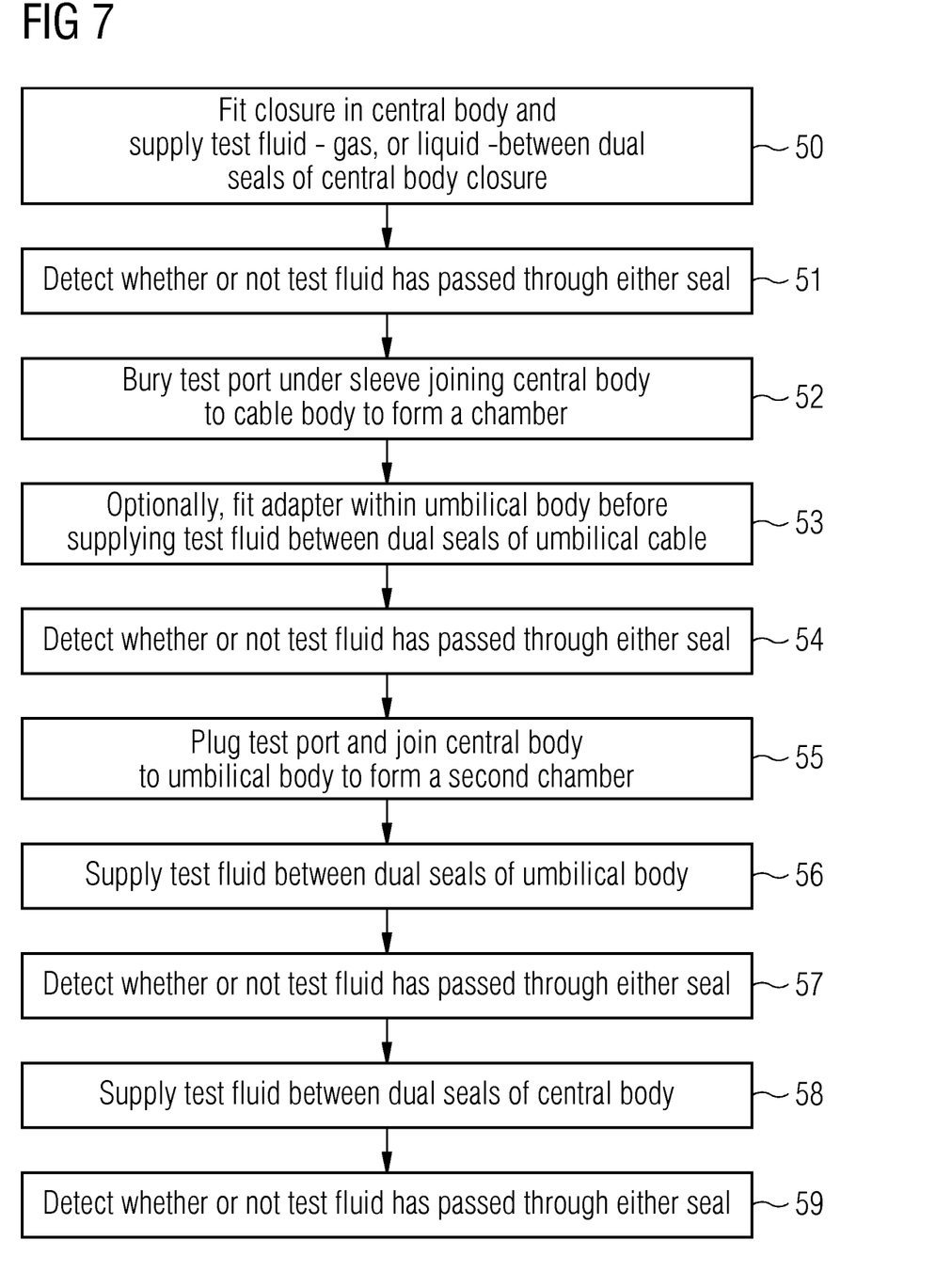
FIG. 7 is a flow diagram of a first embodiment of a method of testing the seal assembly according to the invention, using a pressurisation method; and, FIG. 8 is a flow diagram of a second embodiment of a method of testing the seal assembly according to the invention, using a vacuum method.

In some instances, the test method allows the test port to be buried, which eliminates the requirement for a dual-sealing plug. An example of a buried test port is shown in more detail in FIGS. 5a and 5b. In a first step, a dual-barrier seal is proven between the high pressure penetrator and the body 5 by individually gas leak testing the primary seal 33 and the secondary seal 34, prior to over-sleeving the body 5 with sleeve 4. The test fluid, which may be a suitable liquid, or a gas such as Helium, or Nitrogen, is supplied to a mid-point 35 between these two seals 33, 34 and if the detector does not detect any test fluid at the outlet 40, then the secondary seal 34 is deemed to be intact. Similarly, if no test fluid is detected as having passed through the primary seal from the mid-point 35 to region 41, then the primary seal 33 is deemed to be intact. The test port for this part of the termination is then buried by fitting the sleeve 4 over the body 5 up to the lip 16. The seals 30, 31 seal the body 5 and sleeve 3 and may be tested using a test port of the type illustrated in FIG. 6. FIG. 6 illustrates how the seals 31, 30 between the body 5 and sleeve 3 are tested. To check that these seals are intact, test fluid is supplied through a test port 18 via porting 19 to a point 39 between primary seal 31 and secondary seal 30 where the sleeve 3 and body 5 are in contact. If test fluid is detected at the outlet where the test chamber 7 is formed when the umbilical body 17 is in place, then the secondary seal 30 is deemed to have failed. If test fluid is detected at the outside of the termination 1, then primary seal 31 is deemed to have failed. Once the seals have been tested, the test port 18 is sealed with a dual sealing plug, such as an axial force only (AFO) plug. On completion of these gas leak tests, dual-sealing is proven between the internal chambers and the external environment. Dual-sealing is proven in all directions and therefore a plug is not required in the buried test port. FIG. 7 illustrates an assembly and test method incorporating the different types of seal test mechanisms described above, when the test fluid is supplied at a raised pressure with respect to the surroundings. A closure, for example the high pressure penetrator, is fitted 50 to the central body 5 and test fluid, either liquid or gas, is supplied between the dual seals 33, 34 of the central body closure, as explained above with respect to FIG. 5*a*. A detector, such as a helium sniffer, if the test fluid is helium gas, is used to detect 51 whether or not any test fluid has passed through either seal 33, 34. If there is no evidence of either seal having failed, then the test port 37 is buried 52 under sleeve 4 which joins the central body 5 to cable body 10 to form a chamber 6, as explained above with respect to FIG. 5*b*. If required, a cable termination (not shown) may be fitted 53 within an umbilical body 17 and an adapter provided before supplying the test fluid. Test fluid is supplied between the dual seals 30, 31 of the umbilical cable and if no evidence of the test fluid is detected 54, the two seals 30, 31 are deemed to be intact.

Test port 18 is provided 55 with a suitable plug. Sleeve 3 joins the central body 5 to the umbilical body 17 to form a second chamber 7. Test fluid is supplied 56 between the dual seals 11, 12 of the umbilical body. If no test fluid is detected 57 as having passed through either seal 11, 12, the seals 11, 12 are deemed to be sound. Test fluid is supplied 58 between the seals 20, 21 of the central body 5 and a detector detects 59 whether, or not the test fluid has passed through either of the seals. If at any stage, the test gas is determined to have passed through any of the seals, the seals are replaced and the part tested again. When all the seals have been tested successfully, the assembly and test procedure is completed.

Figure 8:
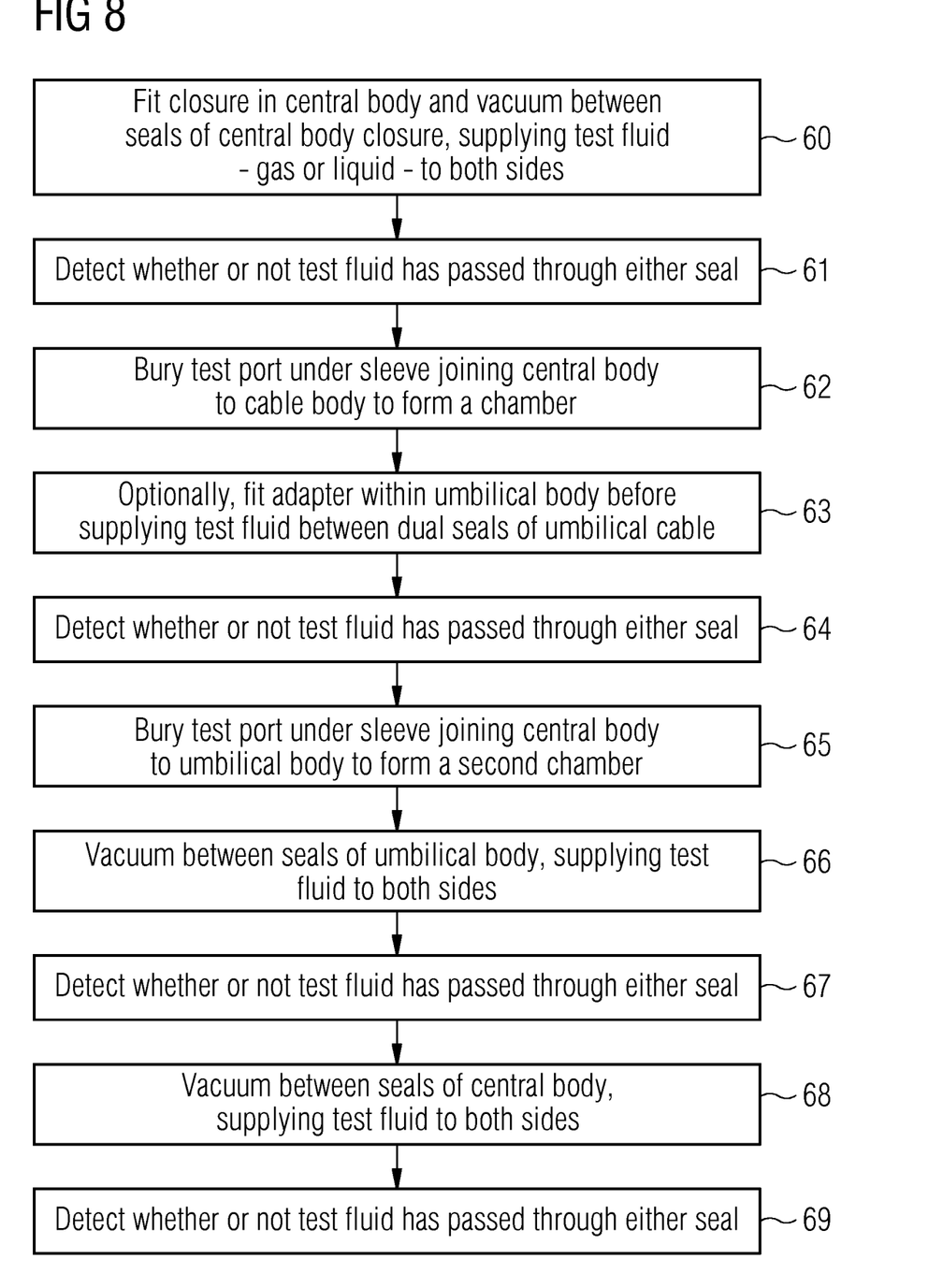

FIG. 8 illustrates an assembly and test method incorporating the different types of seal test mechanisms described above, when a vacuum is used to apply the test fluid. Many of the steps are the same. A closure is fitted 60 in the central body 5 and a vacuum is applied between the dual seals 33, 34 of the central body closure supplying the test fluid, either gas or liquid, to both sides. A detector, such as a helium sniffer, if the test fluid is helium gas, is used to detect 61 whether or not any test fluid has passed through either seal 33, 34. If there is no evidence of either seal having failed, then the test port 37 is buried 62 under sleeve 4 which joins the central body 5 to cable body 10 to form a chamber 6. If required, a cable termination (not shown) may be fitted 63 within an umbilical body 17 and a vacuum applied between the dual seals 30, 31 of the umbilical cable to supply the test fluid to both sides. If no evidence of the test fluid is detected 64, the two seals 30, 31 are deemed to be intact.

Test port 18 is provided 65 with a suitable plug. Sleeve 3 joins the central body 5 to the umbilical body 17 to form a second chamber 7. A vacuum is applied 66 between the dual seals 11, 12 of the umbilical body 17, supplying test fluid to both sides. If no test fluid is detected 67 as having passed through either seal 11, 12, the seals 11, 12 are deemed to be sound. A vacuum is applied 68 between the seals 20, 21 of the central body 5 supplying test fluid to both sides and a detector detects 69 whether, or not the test fluid has passed through either of the seals. When all the seals have been tested successfully, the assembly and test procedure is completed.

Testing both of a pair of seals individually increases the likelihood that the equipment will remain operational on deployment, as both seals would have to fail, whereas with a single test of both seals, it is possible to deploy equipment that in practice only has one functional seal. This is a particular issue for equipment deployed in a subsea environment because of the difficulty and expense involved in carrying out maintenance and repairs subsea, compared with land-based installations. Using this method avoids the need to step seals, further reducing complexity and cost of the parts. This test assembly and method is particularly applicable for fibre terminations of optical fibre-based systems.

It should be noted that the term "comprising" does not exclude other elements or steps and "a" or "an" does not exclude a plurality. Also, elements described in association with different embodiments may be combined. It should also be noted that reference signs in the claims should not be construed as limiting the scope of the claims. Although the invention is illustrated and described in detail by the preferred embodiments, the invention is not limited by the examples disclosed, and other variations can be derived therefrom by a person skilled in the art without departing from the scope of the invention.

The invention claimed is:

1. A dual seal termination assembly, the assembly comprising:
   a first termination body;
   a sleeve at least partially surrounding the first termination body;
   primary and secondary seals adapted to be fitted between the first termination body and the sleeve;
   a test port in the first termination body to supply a test fluid to a point between the primary and secondary seals of the first termination body;
   the test port being adapted to receive the test fluid at a predetermined pressure, such that a pressure difference is created between the point between the primary and secondary seals and a point on an other side of the primary seal and a point on an other side of the secondary seal;
   a second termination body wherein the sleeve is connected between the first termination body and the second termination body to form a chamber; and
   a second set of primary and secondary seals adapted to be fitted between the second termination body and the sleeve,
   wherein the second termination body comprises a first part and a second part;
   wherein the second set of primary and secondary seals is fitted in the first part between the second termination body and the sleeve; and
   a second test port in the first part of the second termination body to supply a second test fluid to a point between the second set of primary and secondary seals of the first part of the second termination body.

2. The assembly according to claim 1,
   wherein the second test port is adapted to receive the second test fluid at a predetermined pressure, such that a pressure difference is created between the point between the second set of primary and secondary seals of the first part of the second termination body and a point on an other side of the primary seal and a point on an other side of the secondary seal of the first part of the second termination body.

3. The assembly according to claim 1, wherein the assembly further comprises:
   a second sleeve fitted to the second part of the second termination body; and
   a third set of primary and secondary seals between an outer surface of the second termination body and an inner surface of the second sleeve.

4. The assembly according to claim 3, wherein the second part of the second termination body comprises:
   an opening adapted to receive a closure member; and
   a third test port at a point between the third set of primary and secondary seals of the second part of the second termination body.

5. The assembly according to claim 4,
wherein the third test port is adapted to receive test fluid at a predetermined pressure, such that a pressure difference is created between the point between the third set of primary and secondary seals of the second part of the second termination body and a point on an other side of the primary seal and a point on an other side of the secondary seal of the second part of the second termination body.

6. The assembly according to claim 3,
wherein the assembly further comprises a third termination body and the second sleeve is fitted between the second part of the second termination body and the third termination body.

7. A dual seal termination assembly test system, the system comprising:
a dual seal assembly according to claim 1, wherein the test port is a first test port, the system further comprising a second test port connected to a space outside of the primary and secondary seals, and
a detector connected to one of the first test port and the second test port for detecting whether a test fluid has passed through any of the primary and secondary seals.

8. The system according to claim 7, wherein the test fluid comprises helium or nitrogen.

9. The system according to claim 7, wherein the primary and secondary seals comprise an elastomer.

10. The system according to claim 7,
wherein the termination assembly comprises a termination for an optical fibre cable, or an electrical cable.

11. The system according to claim 7,
wherein the predetermined pressure is one of a vacuum, or a pressure greater than 1.1 times atmospheric pressure at a test location.

* * * * *